Aug. 27, 1963　　　M. BEAUVAIS　　　3,101,995
CONTINUOUS TREATMENT OF FOOD CONTAINERS
Filed Jan. 19, 1961　　　　　　　　10 Sheets-Sheet 7

INVENTOR
MAX BEAUVAIS
BY
ATTORNEY

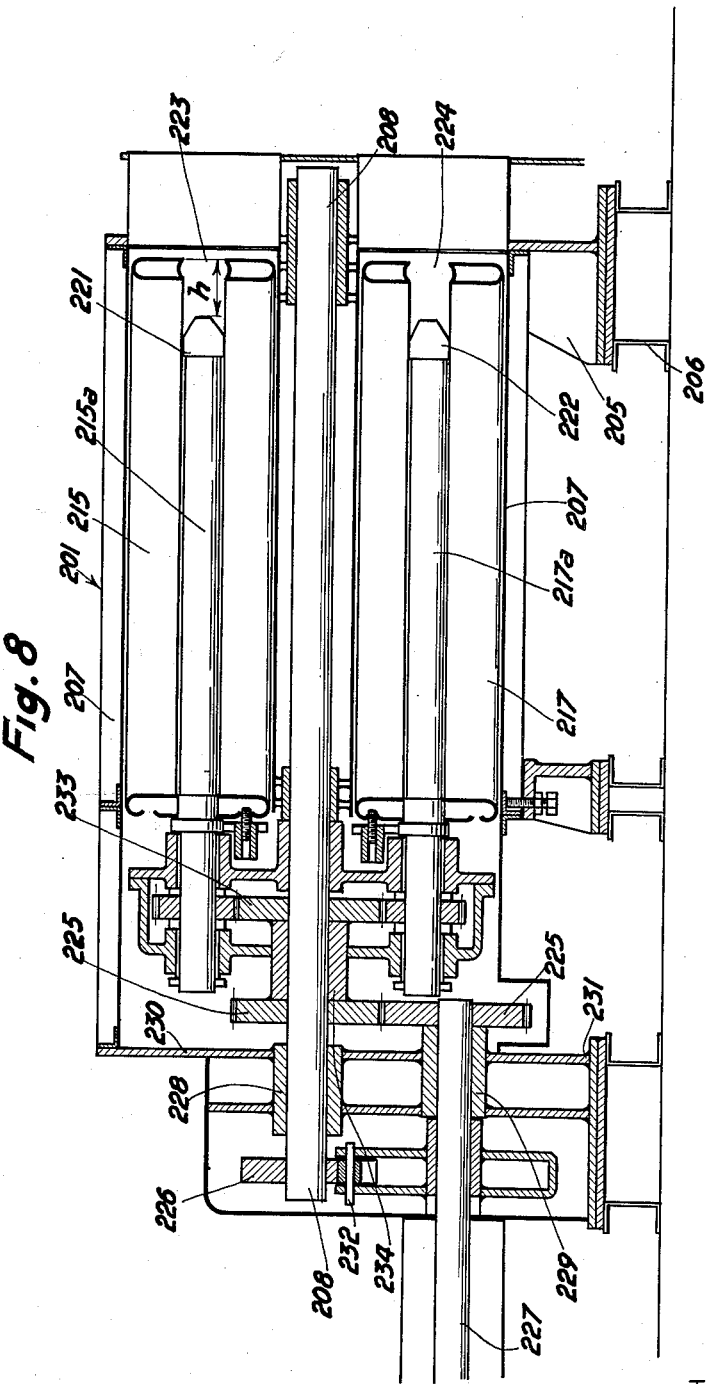

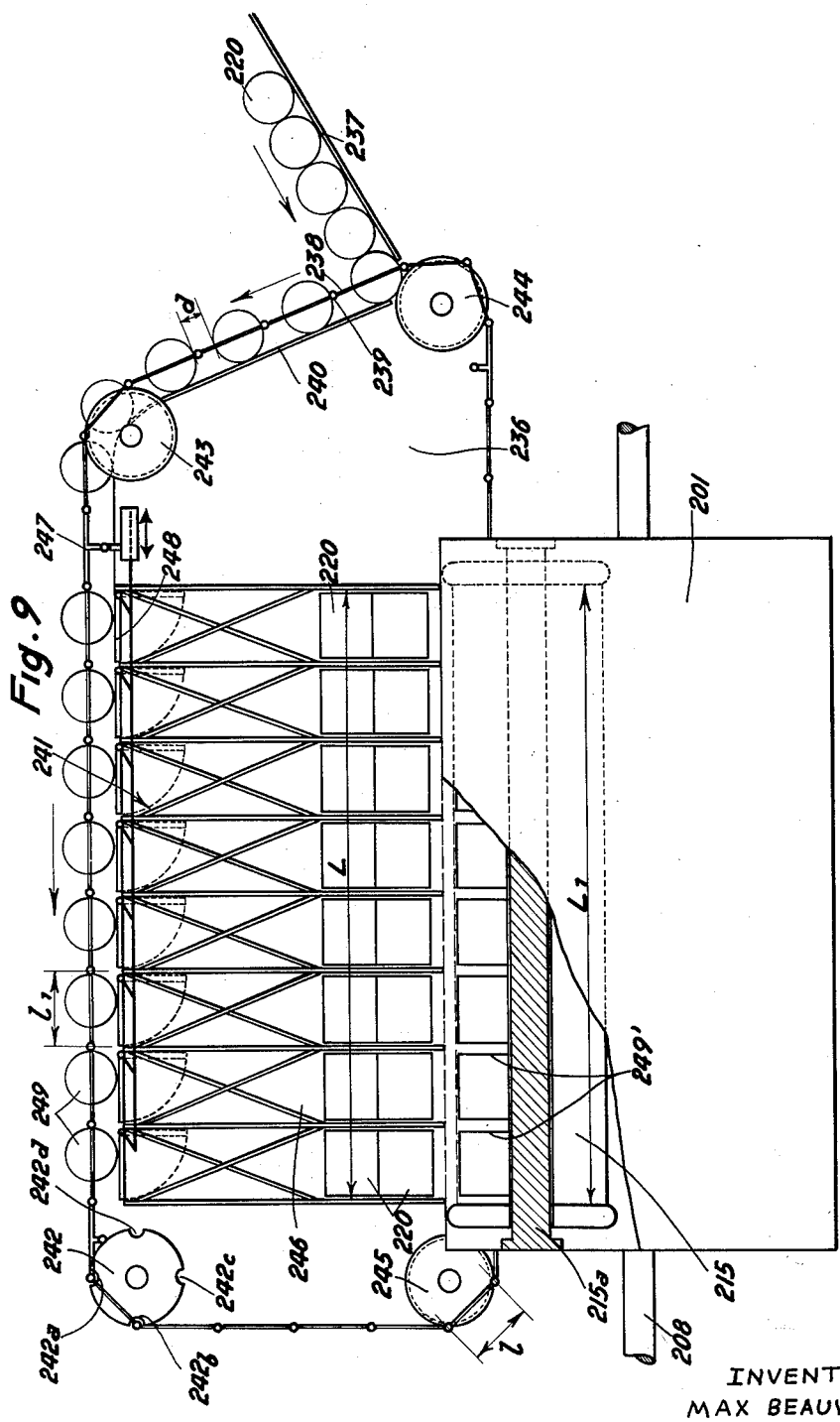

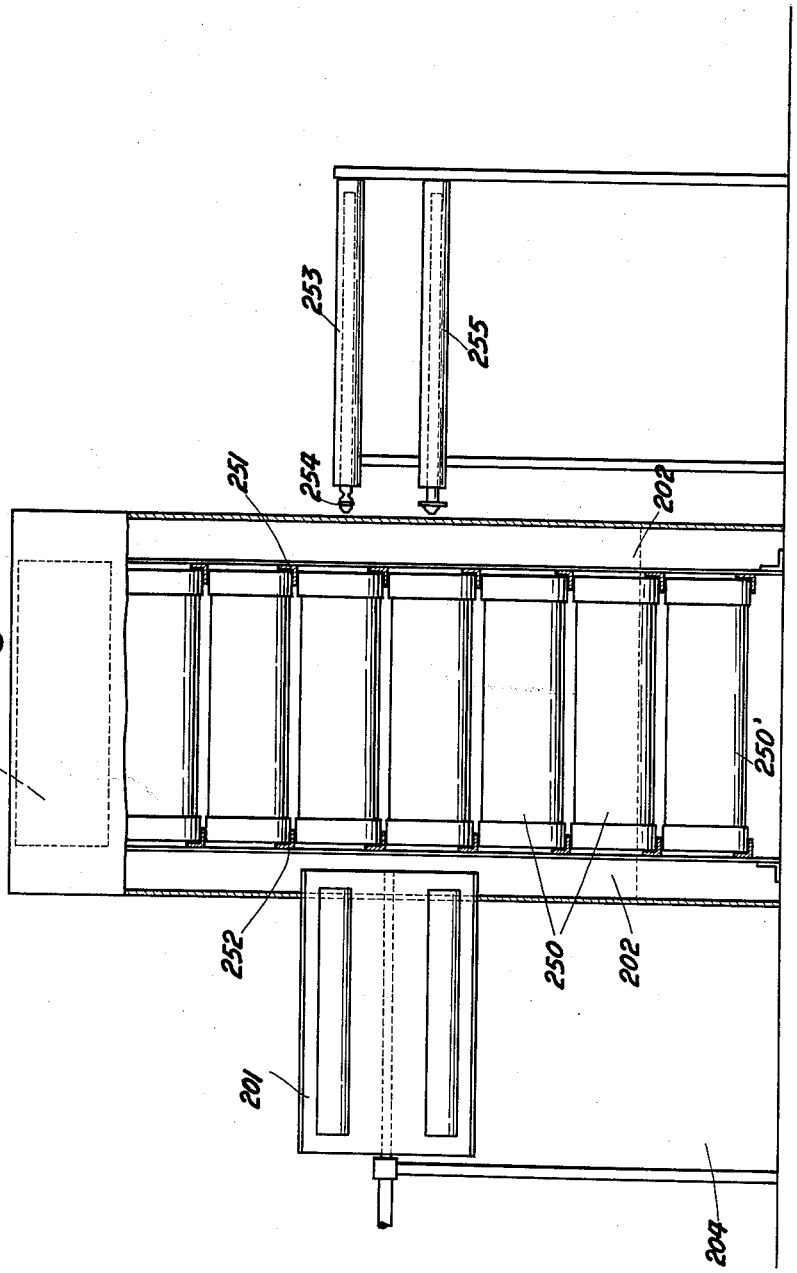

United States Patent Office 3,101,995
Patented Aug. 27, 1963

3,101,995
CONTINUOUS TREATMENT OF FOOD
CONTAINERS
Max Beauvais, Moulin de Montreuil,
St. Georges Motel, Eure, France
Filed Jan. 19, 1961, Ser. No. 99,329
Claims priority, application France Sept. 28, 1960
19 Claims. (Cl. 21—78)

This invention relates to systems for the continuous, and preferably automatic, treatment of large numbers of similar articles, in which the articles are to be passed serially through a treating zone at a controlled rate. More especially though not exclusively the invention is concerned with sterilizing treatments as applied to food products such as preserve containers, bottles, and the like.

The present practice in this field generally consists in placing a number of the articles to be sterilized (or otherwise treated) into each of a series of receptacles such as perforate baskets or the like, and passing the receptacles through an enclosure in which the prescribed treating conditions are maintained. This usually involves circulating one or more fluids, such as heated water or steam through one zone of the enclosure, and cold water through another zone of the enclosure. Sometimes the receptacles are made to revolve rapidly to promote uniformity of treatment. For introducing the containers into and withdrawing the containers out of the enclosure after treatment, water-lock arrangements have to be provided in view of the usually superatmospheric pressure obtaining inside the enclosure.

Present treating systems of this type are not altogether satisfactory especially in that they require considerable expenditure of energy to propel the conveyors through the enclosure in which high pressure liquid is usually present, while at the same time necessitating considerable manual labour for the charging of untreated articles into the receptacles and the discharging of treated articles from the receptacles, as well as for charging and discharging the receptacles on and from the conveyors. In view of the great numbers of articles to be treated in present-day preserve and bottling plants, the above power and labour expenditure constitute heavy economic handicaps.

Objects of the invention, therefore, are to provide an improved treating system in which the expenditure of motive energy required to propel the articles through the treating enclosure, and/or the labour expenditure involved in handling the articles and the receptacles therefor (if used), is or are very greatly reduced. Another broad object is to enhance the general efficiency of an automatic treating or processing plant.

In accordance with an important aspect of the invention, there is provided a system for continuously treating articles while controlling the flow of the articles through a treating enclosure, which comprises a plurality of vertically-spaced surfaces extending across the enclosure in overlapping relationship such that articles are able to drop off an output end of one surface on to the adjacent input end of an immediately underlying surface whereby to define a zig-zag path for the articles down and through the enclosure; means for propelling the articles along the path; means for serially introducing untreated articles and withdrawing treated articles into and out of the enclosure at an upper and a lower end of the path respectively; and feed control means selectively displaceable adjacent opposite ends of the surfaces for respectively preventing and permitting the fall of an article off one surface onto the underlying surface thereby to control the flow of articles along said path.

It will be seen that with the basic provision of the invention as thus described, the use of conveyor chains or the like for passing the articles through the enclosure is entirely eliminated, and that the force of gravity is relied upon to a large extent for moving the articles through the enclosure. This is an important advantage since the enclosure is usually filled with liquid under superatmospheric pressure; the articles can easily be elevated to an elevation corresponding to the top of the zigzag path by means disposed exteriorly of the liquid-filled enclosure and requiring less drive power.

The means for propelling the articles along the surfaces may also be gravity, for which purpose the surfaces need simply be somewhat inclined to the horizontal plane from the input to the output end of each surface.

According to a preferred form of the invention, the feed control means for alternately preventing and permitting the fall of the articles off the surface output ends, may comprise a vertical frame reciprocated horizontally in the enclosure between two end positions, and having opposite side frame members so positioned adjacent the respective ends of the surfaces that in one end position of the frame one of the frame side members permits and the other frame member prevents, while in the other end position said one side member prevents and the other permits, the falling of articles off the output ends of the surface onto the input ends of underlying surfaces.

As an alternative to gravity as the means for propelling the articles along each surface, the afore-mentioned frame may be provided with driver members, e.g., rocking arms, for achieving the stated purpose, and the surfaces may then be horizontal rather than inclined.

The invention in other of its aspects provides various improvements in the means for automatically charging and discharging the articles into and out of receptacles which are passed through the enclosure in the manner indicated above. In a preferred form of the invention, the said receptacles form a series which travels stepwise over a closed-loop path which included the afore-mentioned zigzag path through the treating enclosure, said closed-loop path further including an upgoing path portion outside the enclosure for elevating the receptacles from the level corresponding to the bottom to that of the top of the zigzag path. In this exterior upgoing path portion, means are provided for automatically discharging the treated articles from each receptacle as the latter is elevated past a discharging station, and for then charging untreated articles into each empty receptacle as the latter is elevated past a charging station positioned above the discharging station.

The above and further objects, features and advantages of the invention will become apparent as the disclosure proceeds with reference to the accompanying drawings given by way of illustration but not of limitation, and wherein:

FIG. 8 is a longitudinal section on the line II—II of FIG. 7;

Figure 2:
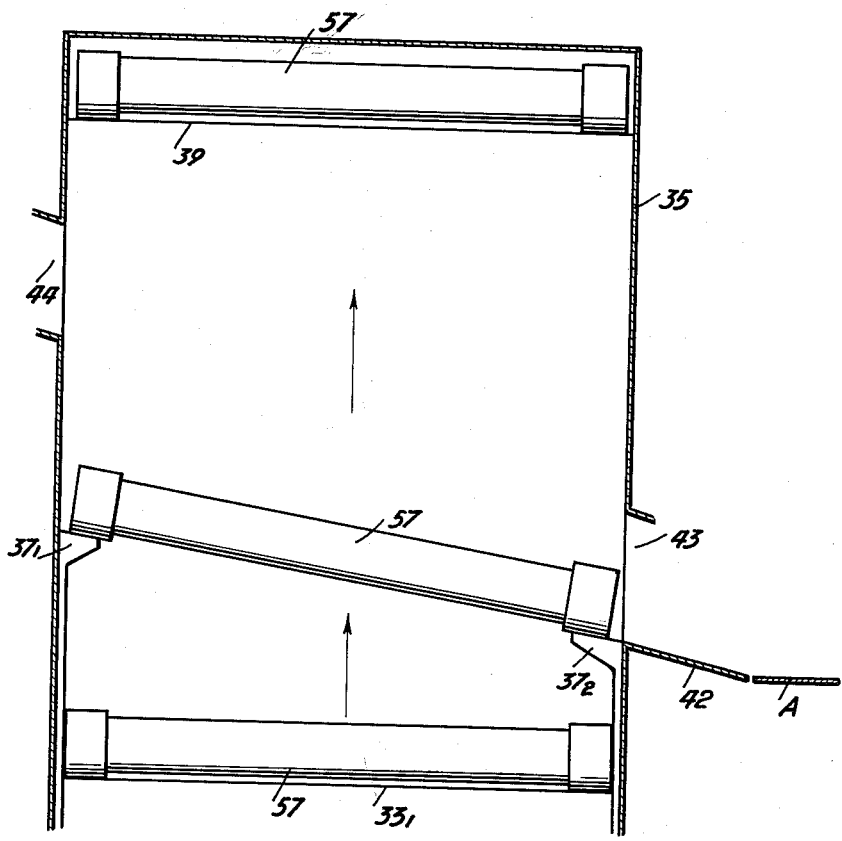
FIG. 2 is a section on line II—II of FIG. 1.
Figure 7:
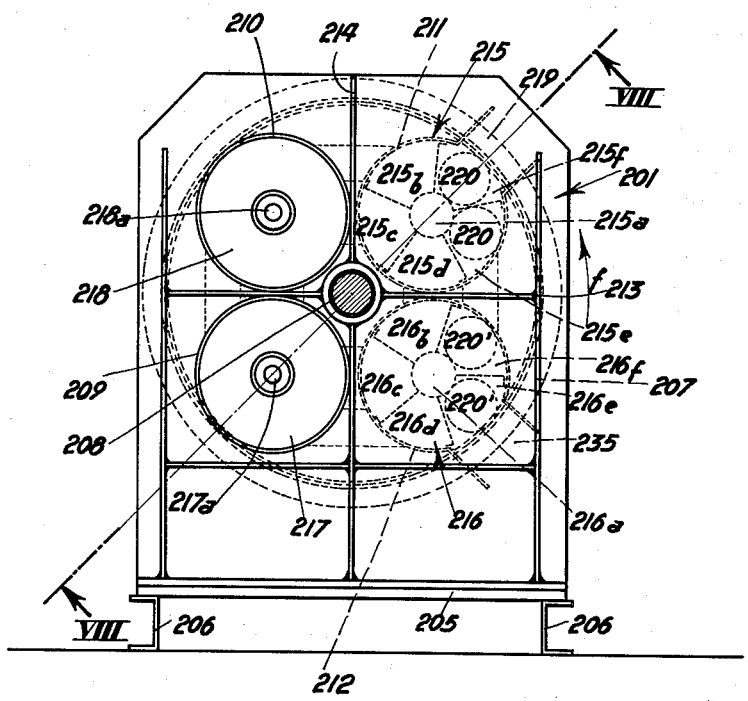
FIG. 7 is a traverse cross sectional view of a form of rotary distributor unit which is advantageously used according to the invention for loading articles, e.g. preserve cans, into, and unloading the treated articles from, cylindrical receptacles of the type shown in the preceding figures.

FIG. 9 is a vertical view, partly broken away, of an aligner unit which may advantageously be used for introducing small cylindrical articles, such as preserve tins or cans, into the distributor unit of FIGS. 7 and 8 prior to the loading of said articles into the receptacles; and FIG. 10 is an elevational view of a system for automatically transferring articles from the distributor unit of FIGS. 7–9 into the receptacles positioned in the elevator path of the system, and for transferring the treated articles from said receptacles into the distributor unit, by a method that forms an alternative to the method described with reference to FIG. 2.

Figure 1:
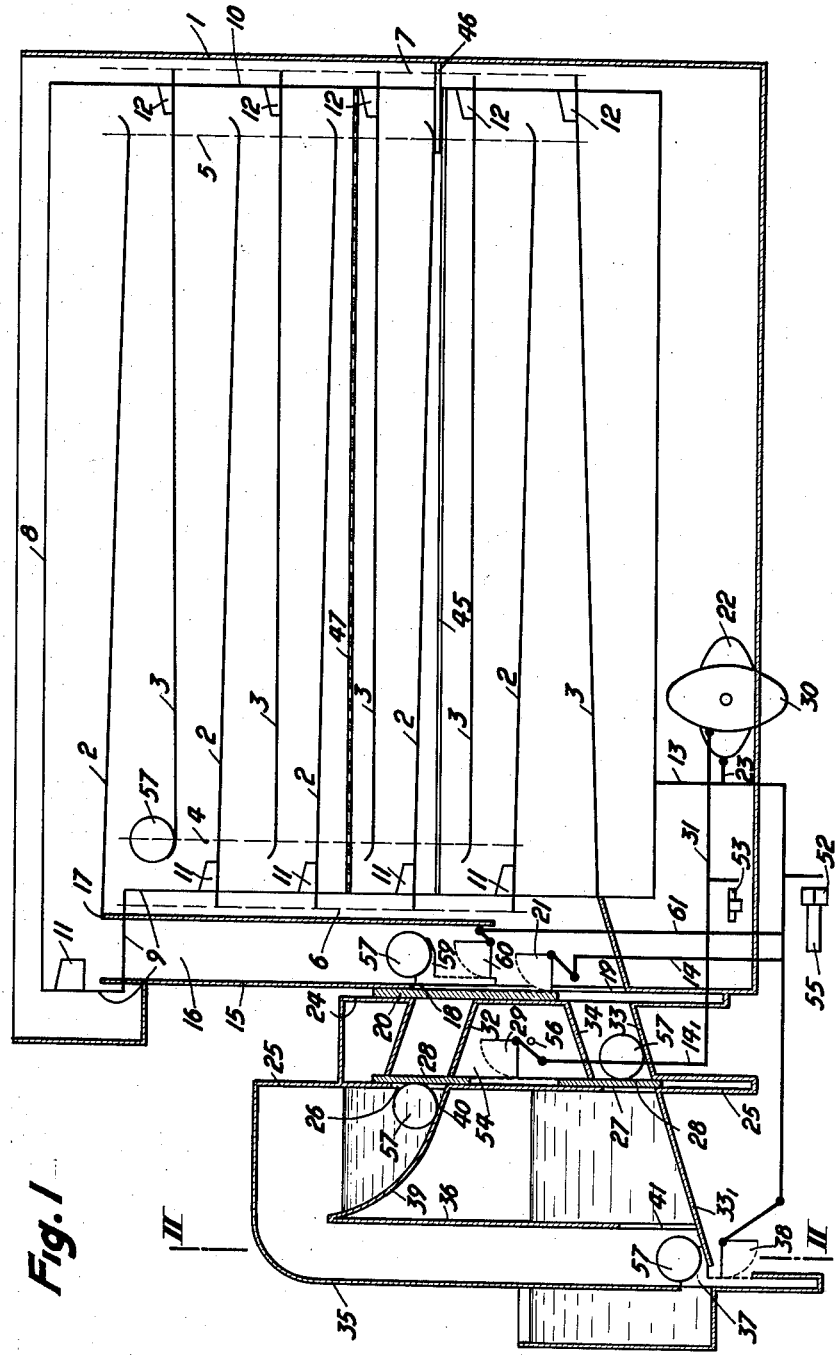
FIG. 1 illustrates a vertical cross section, in highly schematic and simplified form, a sterilizing system according to one embodiment of the invention.

As shown in FIG. 1, a sterilizing apparatus according to a form of this invention comprises an e.g. metallic enclosure 1, which may be of generally rectangular configuration but is presently shaped as later described. Fixedly mounted within the enclosure 1 by any suitable means not shown are two sets of inclined planes or shelves 2 and 3. The shelves of each set are vertically spaced from one another and the two sets of shelves are vertically interspersed as shown. Moreover the shelves of the two sets are provided with a small sloping angle to the horizontal plane (e.g. about 1%) the slope angle being reverse as between the two sets. Thus as shown in the set 2 the shelves have their left-hand (input) ends attached in a common vertical plane 6 and the shelves slope downwards and rightwards towards their free (or output) ends which are all aligned in a common vertical plane 5; and in the set 3 the shelves have their right hand (input) ends attached in a common vertical plane 7 and the shelves slope downwards and leftwards towards their free (or output) ends all aligned in a vertical plane 4. It will be easily understood that with the arrangement shown an article initially positioned upon the top shelf 2 will be able to travel by gravity down the respective shelves of alternate sets in a zigzag path down to the bottom of the enclosure.

A generally rectangular frame comprising horizontal side bars 8 and vertical side bars 9 and 10 is arranged within the enclosure in a vertical plane and is suitably mounted, on ways not shown, for shifting displacements in a horizontal direction in the plane defined by said frame, i.e. the horizontal shifting displacements occur in the plane of the drawing in FIG. 1. The vertical side bars 9 and 10 of the frame are respectively provided with two sets of vertically spaced stop members 11 and 12 which are generally positioned at levels corresponding to the inclined shelves 2 and 3 respectively, as shown. The aforementioned shifting or reciprocation may be imparted to the frame 8—9—10 through a linkage 13 and an attached follower link 14 operated by an oval cam 22 rotated from a motor, not shown. The arrangement is such that the amplitude to the reciprocation imparted to frame 8—9—10 corresponds substantially to the horizontal displacement or offset present between the two pairs of vertical planes 4—6 and 5—7.

Formed along one side (as shown the left side) of the enclosure 1 is a vertical well or chute 16 which communicates at its upper end 17 with the input end of the uppermost shelf of set 2, and serves to convey receptacles thereto as will presently appear.

The charging and discharging means for introducing and withdrawing receptacles into and out of the enclosure for treatment therein regardless of the pressure difference will now be described, such means being generally shown in FIG. 1 as positioned outside the enclosure 1 and to the left of it.

Formed in the outer side wall 15 of the enclosure 1 are a pair of vertically spaced openings 18 and 19 which are adapted to be opened and closed selectively by means of an integrally interconnected pair of sliding valve-gates 20 displaceable vertically through suitable mechanism herein diagrammatically shown as comprising a gear sector 21 driven from the general drive motor of the system through a link 14 cooperating through a follower member 23 with cam 22.

The valve gates 20 are arranged to slide up and down in watertight sealing relationship between the outer surface of enclosure wall 15 and the adjacent surface of another wall 24 extending in parallel spaced relation with wall 15 and forming one vertical wall of a lock chamber, which has the opposite vertical wall 25. Formed in the lock chamber wall 25 are a pair of vertically spaced openings 26 and 27 adapted to be opened and closed by an integral pair of vertically reciprocable valve gates 28 operated through a gear sector 29 driven through a link $14_1$ cooperating by way of a link 31 with the periphery of a cam 30 mounted coaxially with cam 22 but angularly displaced therefrom as shown. As will be seen from the drawing, the upper opening 18 in enclosure wall 15 is at a somewhat lower elevation than the upper opening 26 in the lock chamber, and the reverse relationship holds for the two lower openings 19 and 27. The lower edges of the two upper openings 18 and 26 are connected by an inclined wall 32, and the lower edges of the lower openings 19 and 27 are connected by an inclined wall 33, the walls 32 and 33 being reverse in slope owing to the relationship described. Furthermore the upper edges of both lower openings 19 and 27 are interconnected by an inclined wall 34 parallel to wall 33. The valve gate 28 is a sliding fit against the adjacent lock chamber wall 25 but provision is made for a balancing leakage flow between the adjacent surfaces of the valve gate and wall 25 and wall 34.

Beyond the lock chamber wall 25 a lower water tank is defined by means of an inclined bottom wall $33_1$ which forms an extension of the inclined wall 33, and vertical side walls. From the base of this tank there rises a vertical elevator channel or chamber defined by the parallel spaced walls 35 and 36 which serves as an elevator for the receptacles to be treated, as will be later described. The top of the elevator wall 36 is connected by means of an upwardly concave wall 39 with the lower edge of the upper opening 26, and the other channel wall 35 is connected as shown by a horizontal top wall with the upper end of the extended lock chamber wall 25. Thus another or upper water tank is defined, as shown in the drawing, adjacent upper opening 26.

In the vertical elevator chamber 35—36, a pair of vertically reciprocable pusher member $37_1$, $37_2$ are mounted at the sides of the chamber as shown in FIG. 2. The pusher members are reciprocated up and down in a manner to be more fully described later through gear sectors 38 and linkage operated from cam 22. Formed in opposite sides of the vertical chamber 35—36 are a charging aperture 44, near the top of the chamber, and a discharging aperture 43 near the base of the chamber, aperture 43 delivering onto an output member 42 connected with a discharge output conveyor A. It should at this point be indicated for clarity that in the operation of the system the entire system is filled with a substantially continuous series of cylindrical receptacles such as 57 which are driven in a substantially closed loop by the intermittent reciprocation of pusher members such as $37_1$, $37_2$, each receptacle of the series transmitting the drive towards the next receptacle. Fresh receptacles to be passed through the enclosure are charged into the system through the input aperture 44, are pushed upwards stepwise to drop into the upper water tank at 39, then are propelled into and through the enclosure 1 in a manner later described in detail to be treated therein, and the treated receptacles roll back from the bottom of enclosure 1 to the base of elevator chamber 35—36 through a bottom opening 41 therein, and are elevated in the elevator chamber in which they are emptied of their contents through discharge opening 43, then are replenished through opening 44.

It is further indicated that the drive of the pusher members 37₁, 37₂ is such, that member 37₁ is initially displaced at a faster rate than member 37₂, this being obtained through any suitable mechanism such as suitable gearing ratio as between the respective drive sectors such as 38, so that on reaching the elevation of discharge aperture 43 the receptacles 57 are inclined as shown in FIG. 2 for ready unloading thereof by gravity. Above the elevation of charging aperture 44 the drive of the pusher members becomes such as to cause member 37₂ to catch up with member 37₁ so that the receptacles 57 lie horizontal by the time they reach the uppermost elevation for falling over the water tank wall 39.

Referring to the internal structure in treating enclosure 1, this will be more conveniently described with reference to both FIGS. 1 and 3, FIG. 3 being a vertical cross section through an enclosure similar to 1 but constructed in the form of two intersecting cylindrical sections 49, 50 in accordance with a preferred embodiment of the invention. It is noted that a solid horizontal partition wall 45 extends across the enclosure at an intermediate level thereof generally corresponding in elevation to the middle of opening 18, and said wall 45 is provided with suitable heat isolating characteristics. The portion of the enclosure below wall 45 constitutes a cooling zone, and is filled with cooling water delivered thereinto through at least one pipe 48 (FIG. 3) in a flow direction preferably counter to the direction of travel of the containers down the lowermost inclined shelf 3. This cooling water flows out of the cooling zone into the water lock as will later appear.

Figure 3:
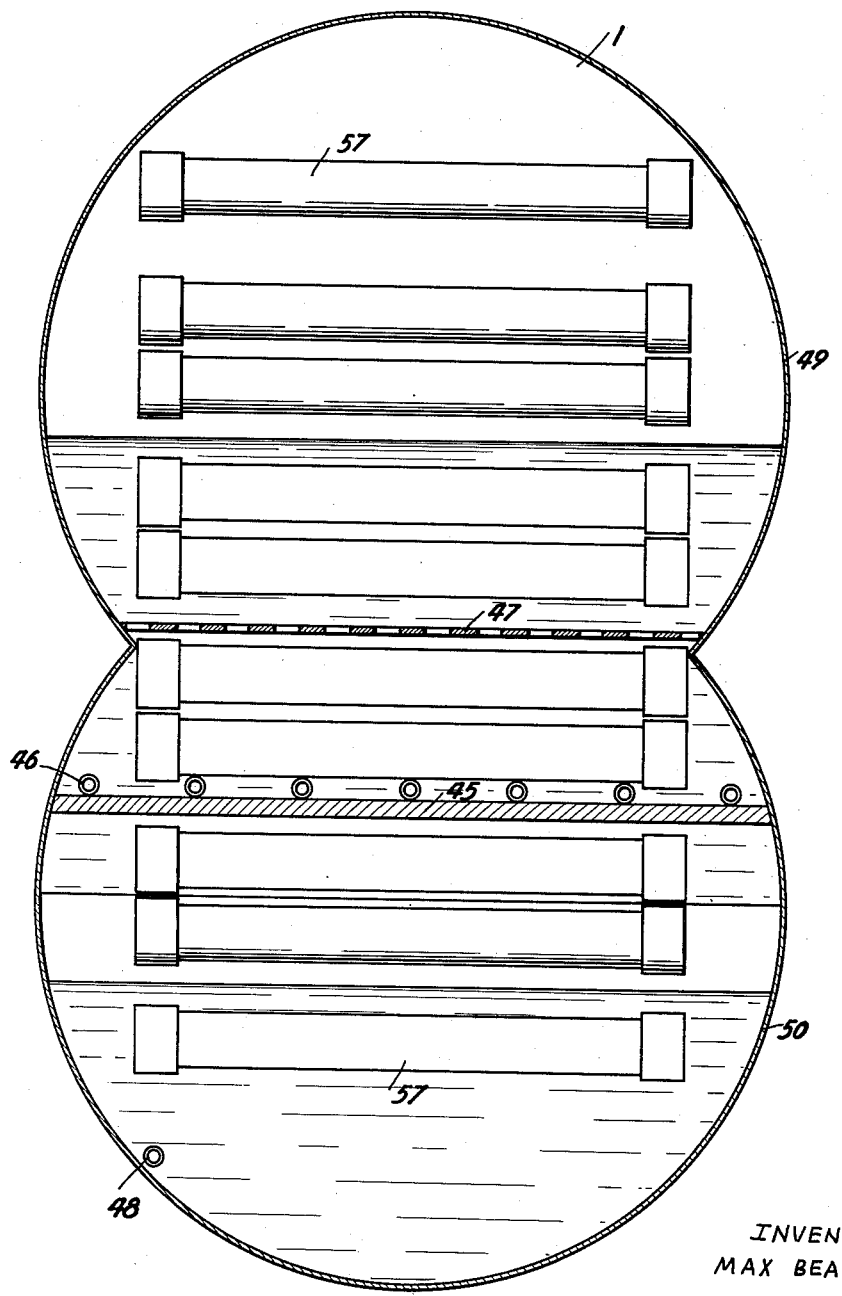
FIG. 3 is a vertical cross section through a treating enclosure according to the invention, on a vertical plane at right angles to that of FIG. 1.

A body of water is also present in the enclosure above the partition 45, up to a certain higher level as shown in FIG. 3. This constitutes a hot water treating zone and is heated e.g. by injection of steam by means of a pipe 46 (FIG. 1). The partition indicated at 47 is merely a perforate stiffener wall which serves to impart strength to the enclosure structure.

Above the body of hot water just mentioned is a vapour treating zone which extends up to the top of the enclosure. It will be understood that the receptacles in their continuous zigzag travel down the enclosure over the successive inclined shelves pass in sequence through the uppermost vapour treating zone, through the hot water zone and finally through the cooling zone to be discharged from the enclosure and out through the lock.

The over-all operation of the system will now be described with more particular reference to the water-lock function. In the form of the invention described, the receptacles 57 actually constitute a set of outer container units which are permanently present within the system throughout the operation and form a continuous series travelling round and round the system in a closed path. These outer containers or receptacles 57 are designed to be filled with the actual articles, e.g. bottles or tins or cans that are to be sterilized, and the said articles are introduced into the receptacles 57 through one end of the latter by way of the charging aperture 44 (FIG. 2), and are removed from receptacles 57 through the opposite end thereof by way of discharge aperture 43 as earlier mentioned.

It will be understood however that in other forms of the invention, the system may be so designed as to operate without the necessity of using the outer receptacles, in which case the parts indicated as 57 would be the articles to be sterilized.

Starting with the point in the continuous operating process in which a receptacle 57 is filled with articles to be sterilized through the charging opening 44, it is seen that the newly charged receptacle is pushed upwards by the upward displacement of the pusher members 37₁ and 37₂ acting through the receptacles positioned ahead of, i.e. below, the newly filled receptacle considered. The latter on attaining the upward end of its stroke falls over the wall portion 39 into the upper water tank. At this time the valve gates 28 are blocking the opening 26 and 27 so that the receptacle under consideration comes to rest within the upper water tank against the upper portion of valve gate 28. At this point of the drive cycle furthermore, communication is established between the interior of the lock chamber 54 and the outer atmosphere, through a vent pipe indicated at 55, controlled by a valve 52 actuated by a stop of the linkage. As the cam assembly 22—30 rotates further, the linkage 31 and gear 29 act to lift the valve gates 28 permitting the receptacle 57 to pass through opening 26 and over the incline 32, into engagement with the upper section of slide valve gate 20 which at this time is sealing the aperture 18. The cams rotating further, linkage 31 acts to move gate 28 to closing position, thereby isolating the lock chamber 54 from the exterior. A valve 53 is now automatically actuated by a stop of the linkage to deliver pressure air into the lock chamber 54 through a pipe 56, and thereafter linkage 23—14 moves gate 20 to open position, allowing the receptacle to pass through opening 19 into the chamber 16, in which the receptacles comes to rest upon the pusher member 59 provided therein, which at this time is in a lowered position. The pusher member 59 is actuated through a gear sector 60 and linkage 61 from the cam 22, to perform a vertical reciprocation in chamber 16 somewhat larger in amplitude than the diameter of a receptacle. Moreover a wall of the chamber 16 is provided with retractable latching means, not shown, preventing a raised receptacle from falling back after the pusher member 59 has commenced its downward stroke. Thus the continuous series of filled receptacles present in the elevator chamber 16 are raised step by step, and at each step an uppermost one of the filled receptacles is subjected to the action of a pusher or deflector member 11′ which pushes it on to the input end of the uppermost inclined shelf 2, down which the receptacle rolls at a moderate velocity until it reaches the other, lower, end of the said shelf.

Meanwhile the frame 8—9—10 is being reciprocated right and left in time with the delivery of receptacles into the treating enclosure, so that the stop members 12 and 11 carried by the vertical sides of the frame alternately prevent and permit the transfer of receptacles from the output end of each shelf to the input end of the shelf immediately below it. In this way the continuous series of receptacles is passed step by step over all the shelves 2 and 3 in succession down the enclosure, it being noted that at one stroke of the frame the receptacles carried by all the shelves of set 2 are simultaneously moving in one direction, e.g. rightward as shown, while at the return stroke the receptacles carried by all the shelves of set 3 are simultaneously moving in the opposite, herein leftward, direction. During its downward zigzag progress each receptacle, and the articles within it, is exposed in succession first to the action of steam in the upper treating chamber, then to the action of the heated water in the second treating zone, and finally, below partition 45, to the cooling action of the water in the lowermost cooling zone. Preferably the cooling water inlet and outlet means in this zone are so arranged that the water flows in a direction counter to the progress of the receptacles. The receptacles issue out of the treating enclosure one by one through the aperture 19 into the lock chamber, it being understood that the relative timing is such that the gate 20 is uncovering the opening 19 at that time. As each receptacle is thus passed from the enclosure into the lock, a substantially equal volume of cooling water is passed with it. Since all the receptacle of the continuous series present in elevator chamber 16 and treating enclosure 1 are effecting their steps of advance simultaneously, it will be clear that matters can be so ararnged that at that point in each operating cycle when both apertures 18, 19 are simultaneously uncovered by the gate 20 (while apertures 26, 27 are sealed by gate 28), one receptacle is passing from out of the lock chamber into elevator chamber 6 through aperture 18, and another receptacle is passing from out of the enclosure into the lock chamber through aperture 19, and at that point in the cycle when both apertures 18, 19 are simultaneously sealed (while apertures 26, 27 are uncovered), one receptacle is passing from out of the upper water tank into the lock chamber through aperture 26, and another receptacle is passing from out of the lock chamber into the lower water tank through aperture 27. Thus the isolating function of the lock arrangement is accomplished, to permit the ingress and egress of the receptacles into and out of the water-filled treating enclosure.

Specifically, every time the gates 28 uncover their apertures, the interior of lock chamber 54 is placed under a pressure at least equal to the internal pressure of the enclosure 1 by actuation of valve member 53 by link 31 to cause delivery of pressure into chamber through pipe 56; and every time the gates 20 uncover their apertures the lock chamber 54 is vented to atmosphere e.g. through vent pipe 55, by actuation of valve member 52 by linkage 23.

On issuing out of the lock chamber into the lower water tank through aperture 27, each treated receptacle rolls down the inclined bottom $33_1$ of the water tank and through aperture 41 into the bottom of the elevator chamber 35—36. Here the treated receptacles are elevated by the reciprocation of the pusher member $37_1$, $37_2$ in the manner earlier described. That is, the treated receptacles are raised in inclined position due to the differential upward movement of members $37_1$, $37_2$ so that as the lower end of each treated receptacle is raised sufficiently to register with the discharge outlet 43, the sterilized articles drop out of the receptacle and through the outlet to be removed by conveyor A. The receptacles, thus emptied of their charge, continue their upward movement still in inclined condition and as the upper end of each receptacle registers with inlet 44 a fresh charge of articles is automatically delivered thereinto by gravity, and the process thus proceeds in a continuous automatic manner.

It will be noted that cold water is entering the enclosure 1 through the lower lock opening and hot water is leaving the enclosure through the upper lock opening, thereby providing an automatic regulation of the water volumes, with the water level in the enclosure remaining at all times somewhat higher than that in the upper water tank.

The rate of travel of the receptacles through the system and hence the treatment time can conveniently be controlled by modifying the number of receptacles present in the system. That is, every time a number of receptacles is removed from the series, the treatment time is increased by an incremental period. Specifically this increment corresponds in percentage to the quotient of the number of receptacles removed over the number of inclined planes or shelves 2 and 3 in the enclosure. Thus in a system having ten inclines as shown, the removal of a receptacle will increase the treating period by 10%.

Figure 4:
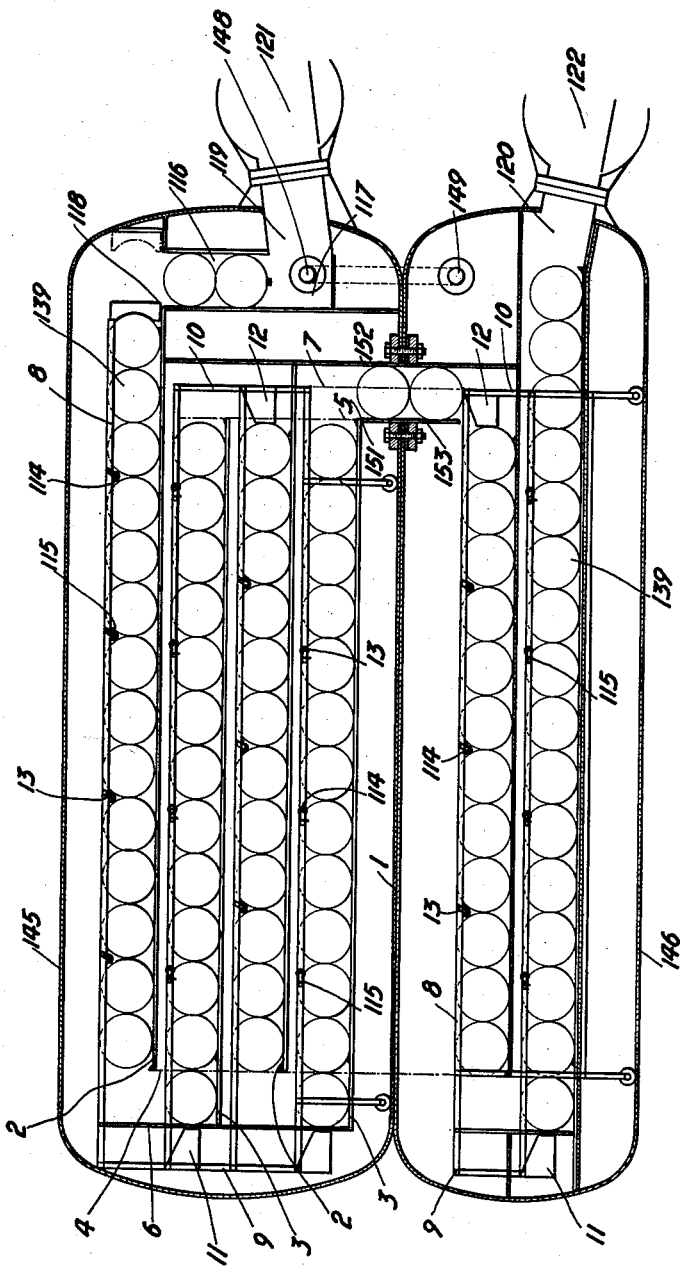
FIG. 4 is a view in elevation of one practical and preferred embodiment of a treating enclosure in a sterilizing system according to the invention.

In the modified embodiment shown in FIG. 4, the sterilizing system comprises a treating enclosure 1 having the two sets of shelves 2, 3 mounted therein by any suitable means with the respective ends of shelves 2 being all positioned in the respective planes 4, 7 and the ends of shelves 3 in the respective planes 5, 6. In this case however all the shelves are horizontal instead of being oppositely inclined. The enclosure in this instance is in the form of a pair of two separate, superimposed generally cylindrical drum sections 145 and 146, as shown, the upper and larger section 145 being shown as provided with two shelves of each set 2 and 3, and the lower section 146 with one shelf of each set. See also the transverse view, FIG. 6. Mounted in each enclosure section for horizontal reciprocation therein by means of rollers as shown, is a vertical frame composed of a number of spaced horizontal members 8 and vertical side members 9 and 10. The side members 9 and 10 are provided with pusher elements 11 and 12 respectively, at the respective levels corresponding to the shelves. As a substitute for gravity in promoting the advance of the receptacles along the shelves, since the latter here are horizontal, the frame members 8 are provided at spaced points thereon with rocking arms 113 carrying rollers 114 pivoted on their free ends for driving engagement with the receptacles as the frames are reciprocated. Stops 115 may be provided for defining the limits of rocking movement of the arms. The reciprocation of the frames is derived through suitable linkage from motor means, none of which have been shown, timing means being included such as cams or the like similar to what was described in broad lines in connection with FIGS. 1–3.

Defined upward of the vertical wall 116 at one end of the upper enclosure body is an elevator chamber 117 communicating at its top at 118 with the input end of the uppermost shelf 2. The bottom of elevator chamber 116 communicates through an inlet aperture 119 with an inlet or charging conduit 121, upwardly inclined away from the enclosure, containing a lock chamber later described, and leading to an upper water tank not shown. The lower enclosure body 146 has an outlet or discharge aperture 120 formed in its end wall below aperture 119 and registering with the outlet end of lowermost shelf 3, and connecting with an outlet conduit 122 which slants down away from the enclosure and leads to a lower water tank not shown, through another lock chamber now to be described.

Figure 5:
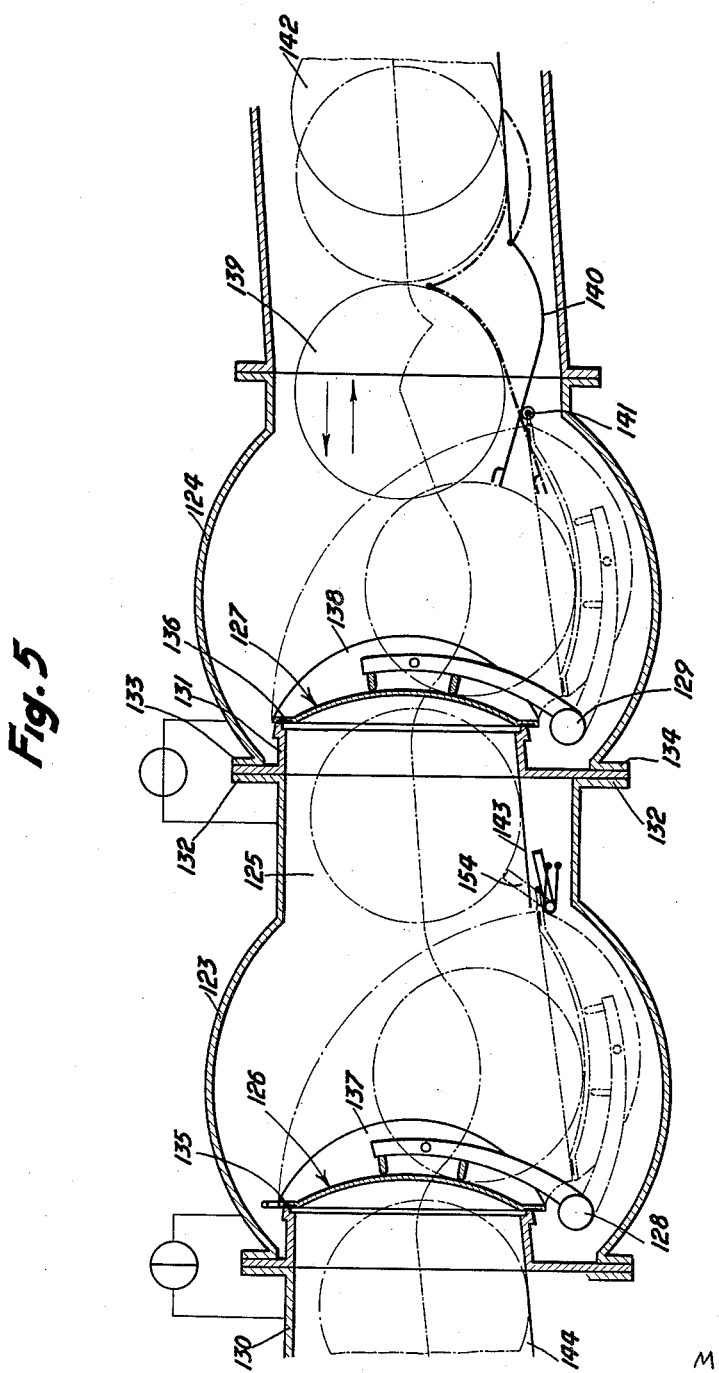
FIG. 5 shows, on a somewhat larger scale, one of the two water-lock arrangements that are provided in connection with the system of FIG. 4 for introducing and removing article-containing receptacles into and out of the enclosure.

The inlet and outlet conduits or tunnels 121 and 122 are similarly constructed and one is shown in sectional view in FIG. 5. The said tunnel is seen to comprise a pair of rounded chambers 123, 124, interconnected by a conduit section 125 extending from chamber 123 and secured through flanges 132, 133 to chamber 124. Communication between lock chamber 123 and the left-hand end of the conduit, is governed by a valve assembly 126; and communication between the chambers 123, 124 is governed by a similar valve assembly 127. Each valve assembly comprises a domed cap 137, 138 secured to arcuate arms pivoted on respective pilots 128, 129 transverse to the general direction of the conduits, said domed caps being adapted to engage through seals 135, 136, peripheral seats formed on the end surfaces of the related conduit sections 130 and 131. The ninety-degree rotation of the valve structures 137, 138 about the pivots 128, 129 between the sealing positions shown in full lines and the open positions shown in chain lines, can conveniently be effected through pneumatic actuator means, not shown.

FIG. 5 diagrammatically illustrates the travel of the receptacles, e.g., out of the enclosure through lower outlet aperture 120 and towards the output water tank. The curve in chain lines represents the path described by the centres of the receptacles. As a receptacle such as 139 enters the tunnel, it is constrained to pass over a spoon-shaped rocker member 140 pivoted about a transverse axis 141, which is caused to rock assuming the chain-line position shown, whereupon the receptacle 139 is deposited upon the concave surface of the domed valve cam 138 at this time in its open position shown in chain lines. On the valve cap 138 being thereafter raised to its closed (full line) position, it pushes the receptacle resting on it through the end opening of conduit section 131, and thereafter firmly seals said opening, thus isolating the enclosure from the lock chamber 125. At the time the rocker 140 is in its rocked, chain-line position, it acts to prevent the approach of the next receptacle indicated at 142. The rocker is roatted back to its normal full-line position as the valve cover member moves to its sealing position. The receptacle that has just entered the lock chamber 125 rolls down an inclined plane 143 and comes to rest against a rocking abutment 154. At this time the valve member 126 in turn is opened and assumes its horizontal chain-line position, at the same time urging abutment 154 to its flat retracted position. The receptacle thereupon rolls into the concave surface of the domed valve cap 137. When the latter thereafter is raised to its sealing position it pushes the receptacle on through the aperture in conduit 130.

It will be understood that the motions just described in connection with the flow of receptacles in one direction through one of the two tunnels 121 and 122, are performed similarly in the reverse sense in the other of said tunnels.

It will also be understood that the motions of the valve and other members just mentioned, as well as other movements of the components in the embodiment shown in FIGS. 4 and 5 are automatically controlled in synchronized relationship through mechanism that may be similar to that shown in FIGS. 1 to 3 or may assume various other forms well-known in the field of automatic engineering.

Figure 6:
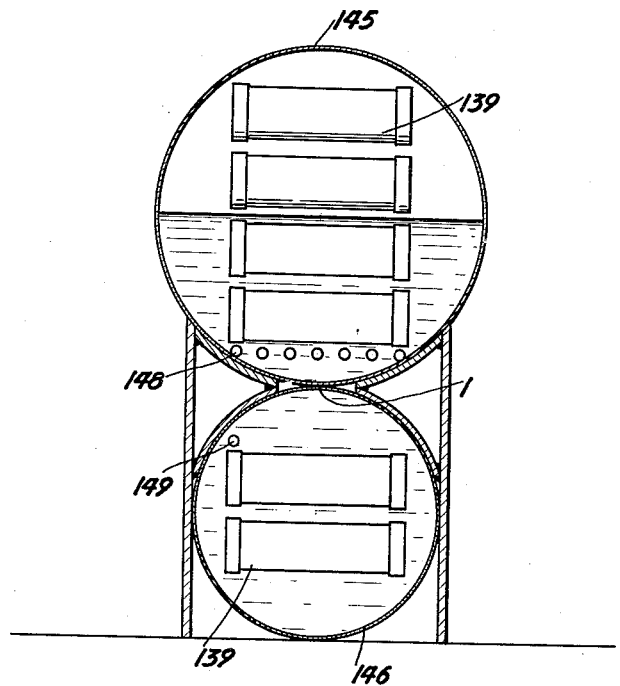
FIG. 6 is a vertical section on a plane normal to that of FIG. 5.

In the construction now being described with reference to FIGS. 4-6, the upper and larger cylinder body section 145 of the enclosure provides the heating zone in the treating process while the lower body section 146 forms the cooling zone. In the upper drum steam is delivered to heat the body of water therein by way of the steam pipes 148, and cooling water is introduced into the lower drum 146 by one or more pipes such as 149. The path of travel of the receptacles through the system in this case includes a vertical connecting channel 153 leading from the upper into the lower cylinder or drum.

Depending on conditions the upper cylinder 145 may be partly or completely filled with water at the sterilizing temperature, the overlying space, if any, being filled with steam. If high pressures are used the upper cylinder may become completely filled with water, and excess pressure may be discharged from the top of it through suitable relief valving. It will be understood that the practical construction described with reference to FIGS. 4 to 6 constitutes a preferred embodiment of the invention, but that if desired various features described in somewhat schematic form with reference to FIGS. 1 to 3 may be incorporated in the embodiment of FIGS. 4 to 6, such for example as the inclined condition shelves along which the receptacles travel, the means for automatically charging and discharging the articles into and out of the receptacles, and other features.

In this latter connection however, it is preferred when using the general construction shown in FIGS. 4 to 6, to utilize a preferred form of automatic charging and arrangement now to be described with reference to FIGS. 7-10, and involving a revolving drum distributor system.

Referring first to FIG. 10, this illustrates at 202 a vertical elevator chamber corresponding generally in function to the chamber 35-36 shown in FIGS. 1 and 2, but associated with a sterilizer apparatus which preferably is of the general type described in connection with FIGS. 4-6. Shown supported on brackets 251—252 in the elevator chamber 202 is a vertical array of cylindrical receptacles 250, to which intermittent upward vertical step displacements are imparted through any suitable means not here shown. It is noted that in FIG. 10 contrarily to what was shown in FIG. 2 the receptacles 250 remain horizontal throughout their upward path of movement. It will be understood that treated receptacles 250 are being introduced one by one into the bottom of the elevator chamber as at 204 after having completed their full cycle of treatment through the system, while at the same time other receptacles 250 are being removed one by one from the top of the elevator chamber as at 203 to commence a new cycle, all as previously explained. Intermediate the chamber 202, therefore, it is necessary to discharge each receptacle 250 of its charge of treated articles and introduce into it a fresh charge of articles to be treated. Preferred means for conducting these operations will now be described.

In this embodiment of the invention each cylindrical receptacle 250 is adapted to contain a star-shaped mount or spider 215 or 216 the cross sectional configuration of which is visible in the dotted-line showings at the right of FIG. 7. It will be seen that each mount comprises a tubular axial portion 215a or 217a from which a number of (here five) angularly equispaced walls project radially so as to define e.g. five compartments 215b through 215f. A mount or spider is shown in longitudinal section at 215 in FIG. 8. Each compartment such as 215b is able to contain a certain number of, e.g. eight, of the articles 220 to be sterilized, disposed in axial alignment therein. In the system now described, a spider mount 215 has its full complement of (e.g. 5×8=40) articles inserted into it in a distributor unit 201 positioned as shown in FIG. 10 adjacent the elevator structure 202. The piston head 254 of a pneumatic ram actuator 253 positioned at a charging station on the opposite side of chamber 202 from the distributor 201 is automatically extended to advance axially through an empty receptacle 250 and into engagement with the end opening of tubular part 215a of a filled spider mount 215 positioned in a waiting position in the distributor unit 201. The ram piston 254 thereon recedes, drawing the mount 215 and its complement of receptacles 220 with it into the receptacle 250, where locking means (not shown) act to retain the spider mount and articles while the piston 254 reenters its ram cylinder 253. At the same time, another similar piston head associated with a ram actuator 255 positioned at a discharging station below actuator 253, is extended to engage the opposite end of the tubular portion 216a of another spider mount 216, filled with forty sterilized articles 220, positioned in the receptacle 250 immediately below the one just considered above. As the piston of actuator 255 advances, the filled spider mount is thus introduced into another section of the distributor unit 201. The receptacle 250 thus unloaded, at the entire vertical array of receptacle 250 is subjected to one upward step of displacement takes the place of the receptacle 250 registering with the piston head 254 and undergoes the charging operation just described above. In this manner the continuous series of receptacles travelling up the elevator 202 are unloaded of their charge of treated articles 220 and filled with a charge of fresh articles 220 to be treated, seriatim.

The distributor unit 210 together with the means for introducing untreated articles into it and removing treated articles from it will now be described in detail.

Referring first to FIGS. 7 and 8, the distributor unit comprises a frame or stand 250 mounted on channels 260 and supporting a horizontal cylinder 207 mounted on a horizontal shaft 208 rotatable in bearing means 228 of the frame. Mounted within the cylindrical body 207 are four smaller cylinders or drums 209, 210, 211, 212 of such diameter and so positioned as to be substantially tangent to the inner surface of cylinder body 207 and to one another. The frame 250 of the unit is shown as including horizontal and vertical cross members 213, 214 extending through the geometrical center of shaft 207 and defining four positions in each of which a minor cylinder 209, 210, 211, 212, is adapted to be positioned when the shaft 207 and body 208 are subjected to intermittent steps of 90° rotation as will be presently described. Each of the four minor cylinders is adapted to contain therein a spider mount 215 or 216, the tubular central parts 215a or 216a of which are received in driving relationship around auxiliary shafts 215a, 216a, 217a, 218a which are rotatably supported on frame 205 and extend parallel to the main shaft 208 and are distributed in angularly equispaced relation around shaft 208. The auxiliary shafts are rotated in synchronism with the main shaft 208 through mechanism presently described. It is noted that each auxiliary shaft such as 215a or 217a (see FIG. 8) terminates in an enlarged tapered head portion 221, 222, spaced a certain distance "h" from the end aperture 223 or 224 of a spider mount 215, 217 positioned therearound. It is this tapered endpiece or head which is adapted for engagement by the piston head such as 254 of the ram actuators 253, 255 previously mentioned for transferring the spiders filled with untreated articles 220 from the distributor unit into a receptacle 250 in the elevator 202 and for transferring the spiders filled with treated articles from a receptacle 250 in chamber 202 back into the distributor unit 201 as earlier described. Untreated articles 220 are introduced into each of the spiders such as 215, while positioned in an auxiliary cylinder such as 211, of the distributor unit 201, through a loading aperture 19 while the related auxiliary cylinder 215 is positioned in an upper station during the intermittent rotation of the main cylinder 207, and similarly treated articles 220 are withdrawn from each of the spiders such as 217 while positioned in an auxiliary cylinder such as 212 through an unloading aperture 235 while the related auxiliary cylinder 212 is positioned in a lower station during said intermittent rotation.

The drive mechanism of the distributor unit is so contrived that the main cylinder shaft 207 is made to dwell for an appreciable period of time in each of the four angular positions of the main cylinder 208, and during each such dwell period of the main cylinder, the four auxiliary shafts 215a, 216a, 217a, 218a are rotated so as to bring each of the five compartments such as 215b–215f of the related spider mount positioned in the loading and unloading stations (right side of FIG. 7) into register with the loading aperture 219 or unloading aperture 235, for introducing or removing the full complement of 5×8=40 boxes into and out of the spider mount.

To achieve this type of drive, as shown in FIG. 8, the main distributor shaft 208 may be driven from a continuously rotated input shaft 227 by way of an intermittent drive of the conventional types variously known as "Saint-Andrew's cross," "Maltese cross," or "Geneva-cross," drive and indicated at 226—232, thereby providing the four dwell periods mentioned above through the well-known operation of such intermittent drive means. Further, input shaft 227 drives each of the four auxiliary shafts such as 215a, 217a through suitable multiplier gearing. For this purpose an output gear 225 of main input shaft 227 is shown meshing with a gear 225 formed on a sleeve 234 freely rotatable about main cylinder shaft 208, and a further gear 233 integral with sleeve 234 meshes with each of four gears respectively secured on the four auxiliary shafts 215a, 216a, 217a, 218a. In FIG. 8, 228 and 229 respectively designate bearings for main cylinder drive shaft 208 and for the input shaft 227.

FIG. 9 illustrates one convenient arrangement for feeding cylindrical articles 220 to be treated such as preserve containers, towards the distributor unit 201 and filling them into a spider positioned at the charging station (aperture 219) in said distributor.

As shown, the articles 220 are delivered down an inclined plane 237 with the axes of the cylindrical articles being transverse to the direction of travel. As they reach the end of the incline 237 the articles are taken up by an endless conveyor chain 238 which is shown to be of a ladder-like construction, with spaced transverse "rungs" 239 preferably in the form of rollers, adapted to engage the tins or cans 220 to drive them along their path. The ladder-like conveyor chain is passed around four pulleys 242, 243, 244, 245 formed with peripheral notches as shown for the pulley 242, for engagement with the rung members 239. The cans 220 are thus raised along an incline 240, and thence conveyed over a flat upper surface defined at the top of an aligner unit generally designated 241. This unit, as shown, overlies the distributor unit 201 and its function is to transfer a set of (herein eight) cans conveyed to its upper surface or track, simultaneously into a compartment of a spider mount such as 215 positioned at the loading station in the distributor unit 201 through the loading aperture 219 as earlier described, while at the same time rotating each of the eight cans during its transfer so as to move the can from its transverse position along the conveyor means, to its longitudinally aligned position as required within each compartment of the spider mount, wherein all eight cylindrical cans must have their axes in alignment. For this purpose, the aligner unit 241 is provided at the top of each of the eight vertical aligner paths 246 with a pivoted trapdoor such as 248 upon each of which one of the cans 220 is placed by the intermittent advance of the conveyor chain 238. An actuator device, such as a pneumatic valve for example, simultaneously opens all eight trapdoors 248, whereupon the articles 220 are admitted into the respective vertical channels 246 of the aligner unit, in which they are rotated 90° by guide means not shown, so that an end face such as 249 of the cans is rotated to the position shown at 249', and all the thus aligned cans are then introduced into the compartment of a spider mount, position at the loading station, through loading aperture 219 as already described.

It will be understood that various modifications may be made in the structure illustrated and described without exceeding the scope of the invention, and that e.g. certain of the features shown herein with reference to a particular embodiment of the invention, may be incorporated in another of the embodiments.

What I claim is:

1. A system for continuously treating articles in a treating enclosure, said articles being similarly shaped rigid bodies which are displaceable in-line one by another over supporting surfaces, which system comprises a plurality of vertically-spaced surfaces extending across the enclosure in overlapping relationship, each of said surfaces having opposite ends adapted respectively for the input of said articles thereto and the output of said articles therefrom and the output end of each overlying surface being disposed above but spaced horizontally from the input end of the immediately underlying surface such that said articles are able to drop one by one off an output end of one surface on to the adjacent input end of an immediately underlying surface whereby said surfaces define a zigzag path for the in-line flow of said articles down and through the enclosure along the path; means for serially introducing untreated articles and withdrawing treated articles into and out of the enclosure at upper and lower ends respectively of the path; and reciprocable feed control means positioned adjacent opposite ends of the surfaces and selectively displaceable for respectively preventing and permitting the fall of an article off one surface on to the underlying surface thereby to control the flow of articles along the path.

2. The system claimed in claim 1, wherein said enclosure has at least one treating zone defined therein and means for circulating fluid under prescribed temperature and pressure conditions through said zone; and fluid tight pressure-lock means connected with said article-introducing and -withdrawing means, and having liquid-containing chambers external thereto for immersion thereof in bodies of liquid, for transferring said untreated and treated articles between said enclosure and the exterior while maintaining the prescribed pressure in said zone.

3. In a system for automatically and continuously treating a series of articles in a treating enclosure, said articles being similarly shaped rigid bodies which are displaceable in-line one by another over supporting surfaces, means for controlling the feed of the articles through the enclosure comprising: two sets of generally flat horizontally elongated, vertically-spaced surfaces extending across the enclosure with the surfaces of the respective sets in vertically interspersed relation, each surface having an input end and an output end and the output ends of surfaces of one set overlying but being spaced horizontally from the input ends of surfaces of the other set whereby said surfaces define a zigzag path for the in-line flow of said articles in a generally vertical plane down the enclosure along the surfaces of the two sets alternately; means for introducing untreated articles serially into the enclosure to the input end of an uppermost one of said surfaces and means for withdrawing the treated articles serially from the enclosure from the output end of a lowermost one of said surfaces; feed-control means selectively engageable with and disengageable from said articles adjacent the respective output ends of surfaces of both said sets for permitting and preventing, respectively, the transfer of said articles from the output ends of surfaces of one set to the input ends of immediately underlying surfaces of the other set; and means for cyclically displacing said feed-control means to cause a controlled, intermittent, step-by-step feed of said articles down said zigzag path.

4. In a system for automatically and continuously treating a series of articles in an enclosure, said articles being similarly shaped rigid bodies which are displaceable in-line one by another over supporting surfaces, means for controlling the feed of the articles through the enclosure comprising: two sets of generally flat horizontally elongated, vertically-spaced surfaces extending across the enclosure with the surfaces of the respective sets alternating in vertically interspersed relation, each surface having an input end and an output end and the output ends of surfaces of one set overlying but being spaced horizontally from the input ends of surfaces of the other set whereby said surfaces define a zigzag path for the in-line flow of said articles in a generally vertical plane down the enclosure along the surfaces of the respective sets alternately; means for introducing untreated articles serially into the enclosure to the input end of an uppermost one of said surfaces and means for withdrawing the treated articles serially from the output end of a lowermost one of said surfaces; generally vertical frame means reciprocably mounted in the enclosure and having opposite side frame members respectively positioned adjacent the opposite ends of the two sets of surfaces; and means for reciprocating said frame means between end positions in one of which one of said frame member permits and the other frame member prevents, and in the other of which said one member prevents and the other member permits, the falling of articles off the output end of a surface of one set on to the input end of an immediately underlying surface of the other set; whereby to cause controlled, intermittent feed of the articles down said zigzag path.

5. The system claimed in claim 4, wherein there are means for propelling the articles along the path comprising driver elements carried by said frame means and operative to engage, and to push along the surfaces of each of said sets, articles received on the input ends of such surfaces.

6. The system claimed in claim 5, wherein said enclosure has at least one upper treating zone defined therein and means for circulating fluid under elevated temperature and at a prescribed pressure therethrough, a separate lower cooling zone and means for circulating cooling fluid therethrough, at least one of said surfaces being disposed in said lower zone and others of said surfaces being disposed in said upper zone, and a vertical passageway for in-line movement of said articles from the output end of the lowermost of said surfaces in said upper zone to the input end of the uppermost said surface in said lower zone.

7. In a system for automatically and continuously treating a series of articles in a treating enclosure, said articles being similarly shaped rigid bodies which are rollable in-line one by another over supporting surfaces, means for controlling the feed of the articles through the enclosure comprising: two sets of generally flat horizontally elongated, vertically-spaced surfaces extending across the enclosure with surfaces of the respective sets alternating in vertically interspersed relation, each surface having an input end an an output end and the output ends of surfaces of one set overlying but being spaced horizontally from the input ends of surfaces of the other set whereby said surfaces define a zigzag path for the in-line flow of said articles in a generally vertical plane down the enclosure along the surfaces of the two sets alternately; each of the surfaces being slightly inclined downward from its input to its output end to propel the articles along said path by gravity; means for serially introducing untreated articles and withdrawing treated articles into and out of the enclosure at an uppermost end and a lowermost end of said path respectively; feed control means positioned adjacent the output ends of said surfaces and selectively displaceable for alternately permitting and preventing the fall of articles off the output ends of some of said surfaces on to the underlying input ends of others of said surfaces; and means for cyclically displacing said feed control means to produce a controlled step-by-step feed of the articles down the zigzag path.

8. In a continuous article-treating system, for treating similarly shaped rigid articles which are displaceable in-line one by another on supporting surfaces, a treating enclosure containing a fluid therein; vertically-spaced surfaces extending across the enclosure in overlapping relation and arranged to enable said articles to drop off one end of one surface on to an adjacent end of an immediately underlying surface whereby to define a zigzag path for the articles in a generally vertical plane down and through the enclosure; means for propelling the articles along said path; means for serially introducing untreated articles and withdrawing treated articles into and out of the enclosure at upper and lower, respectively, ends of said path; feed control means selectively displaceable adjacent opposite ends of said surfaces for respectively permitting and preventing the fall of an article off one surface on to the underlying surface; pressure lock means including a first lock chamber and gate means for connecting and disconnecting said first chamber on one side with said article introducing means and on the other side with the exterior, and including a second lock chamber and gate means for selectively connecting and disconnecting said second chamber on one side with said article withdrawing means and on the other side with the exterior; valve means for selectively pressurizing and venting said lock chambers; and automatic control means for cyclically operating said feed control means, said lock gate means and said valve means in timed relationship in accordance with a predetermined cyclic program.

9. In a continuous article treating system, a treating enclosure; vertically-spaced surfaces each extending across the enclosure and adapted to receive a series of similar generally cylindrical receptacles thereon, each receptacle being adapted to hold a number of said articles therein; said surfaces overlapping and each of them that underlies another having an input end extended horizontally beyond the adjacent end of the immediately overlying surface to enable the receptacles to drop off one end of one surface on to an adjacent end of an underlying surface whereby to define a zigzag path for the receptacles in a generally vertical plane down and through the enclosure; means for elevating the receptacles seriatim from the lower to the upper end of said path exteriorly of the enclosure; feed control means including means selectively displaceable adjacent opposite ends of the surfaces for alternately (a) propelling receptacles along alternate ones of said surfaces from the input ends thereof while preventing the fall of receptacles off the intervening surfaces and (b) propelling receptacles along the intervening surfaces from their input ends while preventing the fall of receptacles off the alternate surfaces; means positioned at a discharging station adjacent said elevating means for withdrawing treated articles from each receptacle as it is elevated past said station; means positioned at a charging station above said discharging station for inserting untreated articles into each empty receptacle as it is elevated past said charging station; and automatic control means for cyclically operating said feed control and said discharging and charging means in timed relationship in accordance with a predetermined cyclic program.

10. The system claimed in claim 9, wherein said discharging and charging means comprise: means for positioning each of said receptacles in an inclined position with one end higher than the other as the receptacle is elevated past each of said stations; means operable as the receptacle is elevated past said discharging station for allowing the treated articles to drop out of the receptacle by gravity from said lower end thereof; and means operable as the receptacle is elevated past the charging station for causing the treated articles to drop into the receptacle by gravity through said higher end thereof.

11. The system claimed in claim 9, wherein said discharging and charging means comprise; means for elevating each of the receptacles in a substantially horizontal position past each station; pusher means operable as the receptacle is elevated past the discharging station for axially penetrating the receptacle from an end thereof to expel the treated articles therefrom into a receiver; and second pusher means operable as the receptacle is elevated past the charging station for axially penetrating the receptacle from an end thereof to propel untreated articles from a feed means into the receptacle.

12. In a continuous article treating-system for treating articles contained in similarly shaped rigid bodies which are rollable in-line one by another over supporting surfaces, a treating enclosure and means for circulating a treating liquid through at least a zone of the enclosure; vertically-spaced surfaces extending across the enclosure in overlapping relation, each of said surfaces that underlies another having an input end extended horizontally beyond the adjacent end of the immediately overlying surface to enable said bodies to drop off one end of one surface on to an adjacent end of an underlying surface whereby said surfaces define a zigzag path for movement of said bodies down the enclosure; feed control means selectively operable to alternately (a) propel said bodies along alternate ones of said surface from the input ends thereof while preventing the fall of bodies off the intervening surfaces and (b) propel bodies along the intervening surfaces from their input ends while preventing the fall of bodies off the alternate surfaces; elevator means exteriorly of the enclosure for elevating said bodies from an elevation corresponding to the bottom of the path to an elevation corresponding to the top of the path; means for discharging treated articles at one level of said elevating means and means for charging untreated articles at another level of the elevating means above said one level; and pressure lock arrangements connecting the bottom and top of the elevating means respectively with the bottom and top of the enclosure for withdrawing said bodies containing treated articles from the bottom of said zigzag path and introducing said bodies containing untreated articles into the top of said path, respectively, while maintaining a desired fluid pressure in said enclosure zone.

13. A system as claimed in claim 12, wherein each of said lock arrangements comprises a conduit; lock gates spaced along the conduit and defining a lock chamber therebetween; valve means for selectively pressurizing and venting said lock chamber; means for selectively operating said lock gates in alternation to sealing and open positions; and means for delivering said bodies successively to said lock arrangements so that one of said bodies is transferred through each lock gate when in open position.

14. A system as claimed in claim 12, wherein said enclosure comprises a pair of horizontal generally cylindrical body sections in superimposed relation; means for circulating heating fluid through the upper body section; means for circulating cooling fluid through the lower body section; there being a plurality of said surfaces in each of said body sections to define a heating zigzag path portion in the upper section and a cooling zigzag path portion in the lower section, and a communication from the bottom output end of the heating path portion to the upper input end of the cooling path portion; said pressure lock arrangements being connected with the lower and upper body sections respectively.

15. The system claimed in claim 14, wherein said feed control means comprise a pair of vertical frames reciprocably mounted in the respective body sections and having opposite vertical frame members positioned adjacent the respective ends of the surfaces for alternately permitting and preventing the dropping of the articles from the end of each overlying surface to the adjacent end of an underlying surface on horizontal reciprocation of the frames.

16. In an article treating system, a treating enclosure; vertically-spaced surfaces each extending across the enclosure and adapted to receive a series of similar generally cylindrical receptacles thereon, each receptacle being adapted to hold a number of said articles therein; said surfaces overlapping and each of them that underlies another having an input end extended horizontally beyond the adjacent end of the immediately overlying surface to enable the receptacles to drop off one end of a surface on to an adjacent end of an underlying surface whereby said surfaces define a zigzag path for the receptacles down and through the enclosure; feed control means selectively operable to cause and alternately prevent the dropping of said receptacles one by one from alternate ones of said surfaces to the underlying surfaces; elevator means exterior of the enclosure and connected at its base and top with the output and input ends of the path respectively for elevating receptacles step by step from a level corresponding to the bottom to a level corresponding to the top of the path; a discharging station adjacent a first intermediate level of the elevator and a charging station adjacent a second and higher intermediate level of the elevator; an intermittently rotatable distributor unit positioned adjacent said elevator and including a plurality of angularly-equispaced sections each adapted to contain a number of said articles therein; said distributor unit being so mounted that in each of its said intermittent positions one of the distributor sections is positioned at said discharging station while another one of the sections is positioned at said charging station; ram means operable at said discharging station for penetrating axially into a cylindrical receptacle positioned at said station to propel the treated articles contained therein into said one distributor section, and further ram means operable at said charging station for penetrating axially into a receptacle positioned at the charging station to propel untreated articles from said other distributor section into the last-mentioned receptacle; means for filling untreated articles into each distributor section at one point of the rotational path of the distributor unit and means for withdrawing treated articles from each distributor section at another point of said rotational path.

17. The system claimed in claim 16, which includes a series of spider-like supports having a number of angularly equispaced radial walls defining compartments therebetween, each compartment adapted to receive therein a linear array of articles to be treated, each of said supports being dimensioned to be snugly fittable into any one of said receptacles and to be snugly fittable into any one of said distributor sections; and said first and further ram means being operative to transfer the supports with the articles therein bodily from a receptacle to a distributor section and from a distributor section to a receptacle, respectively.

18. The system claimed in claim 17, wherein said distributor sections are rotatable for presenting said compartments of one of said supports fitted into one of said sections successively to said filling means, and for presenting said compartments of another of said supports fitted into another of said sections to said withdrawing means, while the distributor unit is at each of its intermittent positions.

19. In the system claimed in claim 16, wherein the articles to be treated are cylindrical, conveyor means for bringing a series of the cylindrical articles to a filling station adjacent said filling means, with all the articles positioned on the conveyor means with their cylinder axes parallel and transverse to the direction of conveyor displacement, and aligning means for receiving a number of said articles simultaneously from the conveyor means and for rotating the articles 90° to present the articles to one of said distributor sections with all the cylinder axes of the articles in alignment.

References Cited in the file of this patent

UNITED STATES PATENTS

| | | |
|---|---|---|
| 1,426,050 | Donnellan | Aug. 15, 1922 |
| 2,154,978 | Galvin | Apr. 18, 1939 |
| 2,549,216 | Martin | Apr. 17, 1951 |
| 2,729,864 | Klink | Jan. 10, 1956 |
| 2,832,106 | Abrams | Apr. 29, 1958 |

FOREIGN PATENTS

| | | |
|---|---|---|
| 731,115 | Great Britain | June 1, 1955 |